Figure 1:
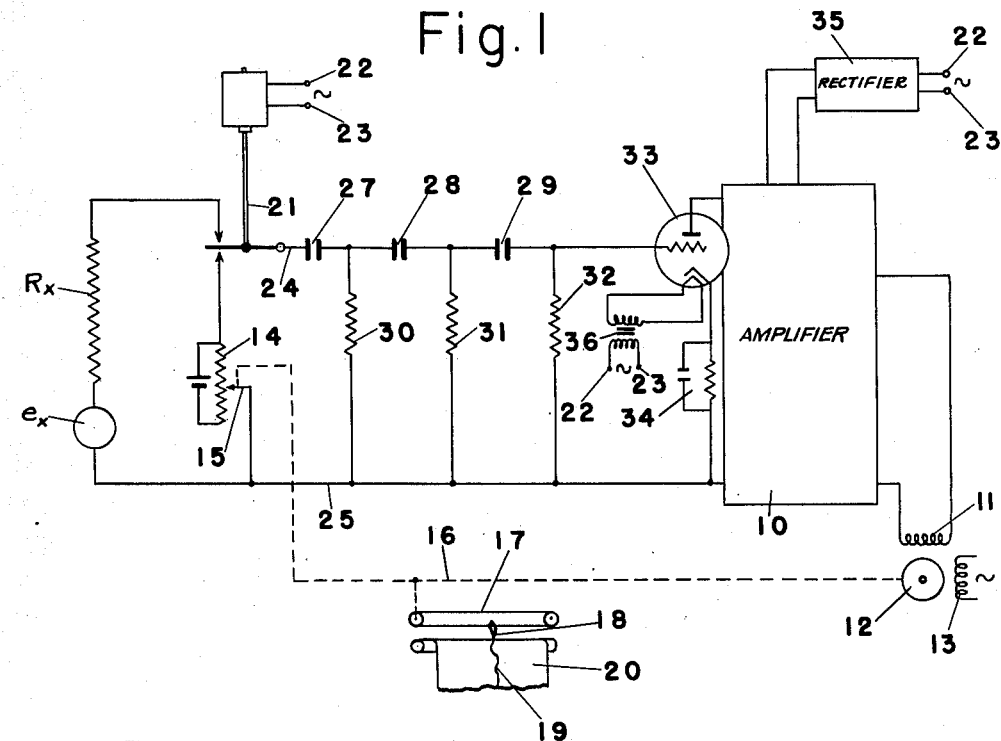

INVENTOR.
RAYMOND E. TARPLEY
BY
Woodcock and Phelan
ATTORNEYS

INVENTOR.
RAYMOND E. TARPLEY
BY
Woodcock and Phelan
ATTORNEYS

Patented Dec. 16, 1952

2,622,192

UNITED STATES PATENT OFFICE 2,622,192

MEASURING SYSTEM WITH GRID CURRENT SUPPRESSOR

Raymond E. Tarpley, Philadelphia, Pa., assignor to Leeds and Northrup Company, Philadelphia, Pa., a corporation of Pennsylvania Application January 6, 1949, Serial No. 69,476

1 Claim. (Cl. 250—27)

This invention relates to balanceable measuring systems suitable for measurement of small voltages or currents, for example, of the order of micromicroamperes, and is particularly concerned with avoiding spurious signals introduced because of variation in the grid current of the first stage of the amplifier and has for an object the provision of a measuring system in which there is provided means for preventing modulation by a converter of a slowly varying grid current.

In measuring systems of the type disclosed in Williams Patents 2,113,164 and 2,367,746, amplifiers have been constructed with high gain for the measurement of input signals of small magnitude. The condition-responsive devices ordinarily produce unidirectional voltages or currents. These are converted to alternating currents of a predetermined frequency for amplification. As the signal varies in accordance with a condition to be measured, whether of temperature, pressure, pH, or the like, it is important to exclude from the input circuit of the detector and amplifier all signals other than those due to changes in the magnitude of the condition under measurement.

In amplifiers of the type utilized in such measuring systems, it has been found that tubes of the type used in conventional radio sets and the like have relatively high grid currents. The converter, if permitted to modulate such grid currents, introduces spurious signals adversely affecting the measurements and which may cause saturation. The amplifiers will be "paralyzed" as a result of saturation and will not respond to the desired signals varying with the magnitude of the condition under measurement. When saturation does not occur, the introduction of the spurious signals will, of course, produce undesired operation and will introduce inaccuracies in the measurement of the magnitude of the condition.

In carrying out the present invention in one form thereof, spurious signals introduced by modulation of a varying grid current have been overcome by including in the circuit between the converter and the amplifier a high-pass filter which readily permits flow of signals at the converter frequency, but at the converter location attenuates slow changes in grid current to prevent modulation thereof by the converter. The effect of a slowly changing grid current is reduced to a point where it is no longer bothersome.

Figure 2:
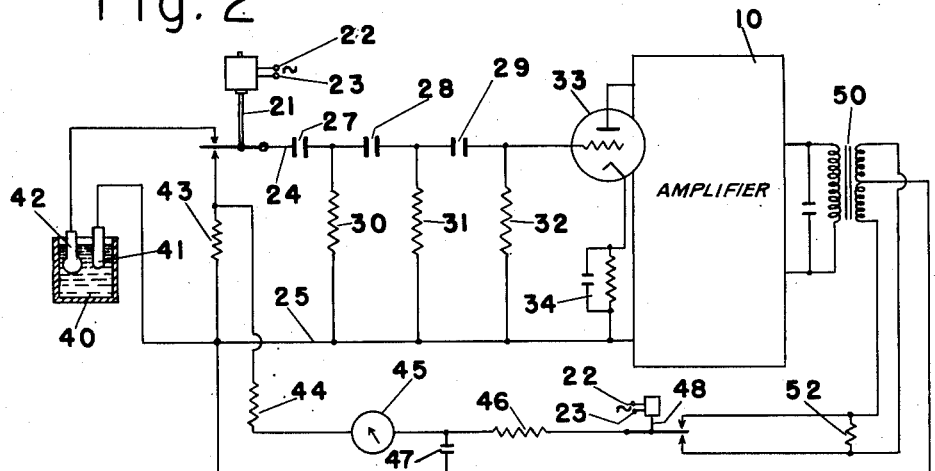

For further objects and advantages of the invention and for a more detailed understanding thereof, reference is to be had to the following description taken in conjunction with the accompanying drawings, in which:

Fig. 1 diagrammatically illustrates a system embodying the invention;

Fig. 2 diagrammatically illustrates a modification of the invention; and

Figure 3:
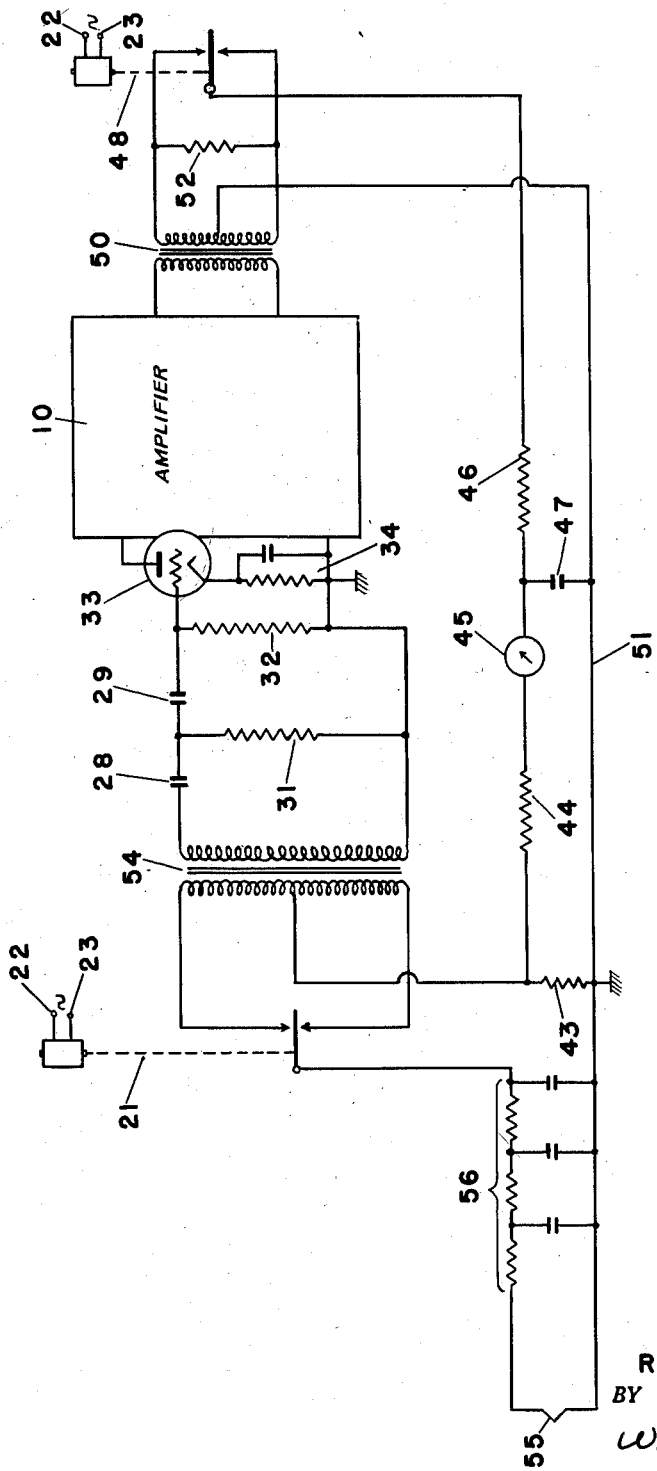

Fig. 3 diagrammatically illustrates a further modification of the invention.

Referring to the drawings, the invention in one form has been shown as applied to the input circuit of an amplifier 10, the output circuit including a winding 11 of a motor having a rotor 12. Another winding 13 of the motor is connected to a suitable source of alternating current supply. The rotor 12 is utilized relatively to adjust a slidewire 14 with respect to its associated contact 15 as indicated by a connection 16. Generally, the rotor 12 is also arranged to drive a violin string or belt 17 of an indicating instrument which may include a recording pen 18 arranged to trace a record 19 of the magnitude of a condition under measurement on a chart 20.

Those skilled in the art well understand how to produce input signals varying in accordance with the condition under measurement such, for example, as by the use of thermocouples, pH measuring electrodes, photoelectric cells, and the like. In Fig. 1 a resistor $R_x$ has been illustrated to represent the resistance of such a device $e_x$ for producing a voltage varying in accordance with the magnitude of the condition.

A vibrator 21 whose operating coil is energized from a suitable source of alternating current 22—23 has a vibrating reed or contact member which serves alternately to connect one side 24 of the amplifier input circuit first to the voltage producing device $e_x$ and then to that fraction of the voltage of slidewire 14 between the adjustable contact and the lower contact of the vibrator. Preferably, the vibrator 21 is polarized so that on alternate half-cycles the movable contact engages the same fixed contact. The other side of the amplifier input circuit is, of course, connected to the contact 15 and to one side of the voltage source $e_x$. In the amplifier input circuit 24, 25 from the converter there is included a high-pass filter comprising condensers 27, 28 and 29 and shunting resistors 30, 31 and 32.

Though any number of filter sections may be utilized, the three sections illustrated will for most cases be sufficient. The signals across the input circuit are applied between the grid and cathode of the first vacuum tube or stage 33 of the amplifier 10, the cathode circuit including a resistor and condenser forming a cathode biasing means 34 for the grid.

The grid current of the vacuum tube 33 has a component which varies as a function of the plate voltage and of the heater temperature. As shown, the plate voltage is obtained through a rectifier 35 supplied from the alternating current lines 22 and 23. Similarly, the filament is supplied from a filament transformer 36 from the same alternating current supply lines. Thus, it will be seen that upon a change in the voltage between lines 22 and 23, there will be a change in both the plate voltage and the heater temperature, with a resulting change in the grid current. Ordinarily, the grid current variations will be at a low rate since neither the plate voltage nor the heater temperature changes very rapidly due to changes in the line voltage. However, grid current variations resulting therefrom do cause a change in potential across the grid resistor 32, and if applied to a circuit including the contacts of vibrator 21, an undesirable spurious signal would be generated and amplified by the amplifier 10.

However, by including the high-pass filter between the grid of the tube and the vibrator or converter 21, the potential at the movable contact of the converter is made independent of slow changes in grid current. In other words, the high-pass resistance-capacity filter attenuates the low-frequency component of the current due to grid current variations, and since interposed between the first amplifier stage and the vibrator contacts, the low-frequency component does not appear at the vibrator and, hence, is not modulated by it to produce spurious signals.

The foregoing spurious signals have, in practice, been found to be particularly undesirable for low impedance devices whose currents are of the order of micromicroamperes, or whose voltages are of the order of microvolts. They have also proved bothersome in devices in which the resistance of the voltage source may be of the order of 1,000 megohms, such for example, as pH responsive glass electrodes. In measuring systems used in connection with devices of the foregoing types, the high-pass filter has made possible the use of ordinary radio type tubes such as the 12SL7 in the input circuit with unregulated sources of anode and filament supply. It has further been found that an input transformer or a single blocking capacitor and grid leak will not sufficiently attenuate grid current variations to prevent their modulation by the vibrator. However, by providing a filter having a plurality of sections, such as the three shown in Figs. 1 and 2, the effect of the grid current variations will be overcome.

For a relatively low impedance condition-responsive circuit $R_x$, $e_x$, of the order of 20,000 ohms to one megohm, the capacitors or condensers 27, 28 and 29 and the resistors 30, 31 and 32 in a preferred embodiment of the invention had values of .05 microfarad and 1 megohm respectively for operation of the vibrator 21 from a 60-cycle source of supply. For a 25-cycle source of supply, the capacitors would preferably have values of the order of .12 microfarad, while the resistors would each have a value of 1 megohm. While the foregoing values for the resistors and capacitors of the filter have been specifically set forth, it is to be understood that they are to be taken as illustrative and that other values may be used, though it is deemed important that each section of the filter shall have a time constant of the order of from .05 second to .5 second for 60-cycle operation of the vibrator or converter 21. It will be observed the products of the respective time constants of .05 and .5 second and 60 cycles are respectively 3 cycles and 30 cycles. For the 25-cycle operation, the time constant would be 2.4 times that for the 60-cycle operation. It will be observed that the products of the time constants and the frequency of the alternating current to be applied to the control grid again come within the range of from 3 cycles to 30 cycles.

For high impedance condition-responsive circuits, such as in Fig. 2, the resistors 30, 31 and 32 preferably have values of the order of 1,000 megohms, with condensers 27, 28 and 29 of the order of 50 micromicrofarads. In high impedance circuits, it is preferable that the time constant be kept low, of the order of .05 second for 60-cycle operation of the vibrator 21.

In Fig. 2, similar parts have been identified with the same reference characters, the invention being shown as applied to the measurement of the pH values of a solution contained in a vessel 40 having a conventional glass electrode 42 and a conventional reference electrode 41, the glass electrode 42 being connected directly to a stationary contact of the vibrator 21, and the reference electrode 41 being connected to the other stationary contact through series resistor 43. This resistor forms part of a negative feedback circuit including series resistor 44, a microammeter 45, a series resistor 46, a shunt filter condenser 47, and the movable contact of a vibrator or converter 48 having an operating coil energized from the same alternating current supply lines 22 and 23.

The amplifier 10 includes an output transformer 50, the secondary winding of which is center-tapped, the extremities of the winding being connected to the respective stationary contacts of vibrator 48, while the center tap is connected by conductor 51 to the juncture of resistor 43 with the input conductor 25 of amplifier 10. A resistor 52 is connected across the secondary winding of transformer 50 as a precautionary measure in the event the vibrator 48 is of the open circuit type. The converter 48, which may be of the same type as vibrator 21, rectifies the output current from the alternating current amplifier 10 which is filtered by means of the filter comprising resistor 46 and capacitor 47, the filtered current flowing through the microammeter 45, through the resistors 44 and 43, and thence by the conductor 51 to the mid-point of the secondary of transformer 50. At balance, the current flowing in the resistor 43 develops a voltage equal to that developed between the electrodes 41 and 42. The resistance between electrodes 41 and 42 may range between 50 megohms and 2,000 megohms. The voltages are small and it becomes particularly important that there not be introduced potential variations at the contacts of vibrator 21 due to changes in the grid current of the amplifier tube 33. Such potential changes due to slow changes in flow of grid current will be attenuated by the high-pass filter between the tube 33 and the vibrator 21 and, hence, as in the case of Fig. 1, their effect will be negligible.

In some cases, as shown in Fig. 3, it is desirable to utilize an input transformer 54 in the first stage of the amplifier 33. The primary winding of the input transformer 54 is shown with the ends thereof respectively connected to the stationary contacts of the vibrator 21 while a mid-tap is connected through the resistor 43 to a conductor 51 which forms a part of the input circuit from a thermocouple or other condition-responsive device 55. In the input circuit from the thermocouple 55 is a low-pass filter 56 designed to exclude alternating current due to stray fields and the like but to permit ready passage of a slowly changing signal such as will be produced by the condition-responsive device or thermocouple 55.

In the modification of Fig. 3, the vibrator 21 first connects the thermocouple circuit to the upper stationary contact and then to the lower stationary contact. If the thermocouple voltage is equal to the voltage introduced by the feedback resistor 43, no signals will appear across the secondary winding of transformer 54. If the voltages are unequal, signals appearing across the secondary winding of the transformer have a phase relation dependent upon which of the two voltages exceeds the other and an amplitude dependent upon the degree of difference.

Assuming now a condition of balance, where no signals appear across the secondary winding of the transformer 54; and further assuming a variation in the voltage of the anode supply or of the filament supply of the tube 33, a slowly varying grid current will result. In the absence of the filter comprising condensers 28 and 29 and the resistors 31 and 32, the slowly changing grid current would produce a voltage across the contacts of the vibrator 21 which would be modulated and applied as spurious signals to the first stage of the amplifier 33. However, by including the high-pass filter between the secondary winding of the transformer 54 and the grid-cathode circuit of the first stage of tube 33, effects due to the slowly changing grid current are so attenuated or reduced at the contacts of the vibrator 21 that there are no spurious signals of consequential magnitude applied to the amplifier 10.

Ordinarily, it has been the practice, where an input transformer has been utilized, to connect the secondary winding directly to the grid and cathode of the first tube. In accordance with the present invention, the inclusion of the condenser 29 and the resistor 32 forms one section of a filter which greatly decreases the adverse effects resulting from slow changes in the grid current of the tube 33. In some applications, a filter comprising a single section has been found to produce such improved operation as to make unnecessary the inclusion of the second section or additional sections.

The values for the condensers 28 and 29 and the resistors 31 and 32 of the filter are preferably of the same order as set forth in connection with Fig. 1. However, in some applications it has been found desirable to utilize a resistor 32 of the order of five megohms in conjunction with a capacitor 29 of .05 microfarad for 60-cycle operation of the vibrator 21.

In the foregoing description reference has been made to a filter which includes condensers and resistors. It is, of course, to be understood that other suitable high-pass filters may be utilized in which the non-conductive elements may be condensers and in which the conductive elements or impedances may be either resistors or inductors. The high-pass filters need not be of the simple resistor-capacitor type illustrated, but the non-conductive path may include inductors or resistors in series with the condensers. However, such filters will include at least one conductive path across the input or grid-cathode circuit. Those skilled in the art will understand how to utilize alternative arrangements and yet attain the attenuation characteristic of the filter which will prevent appearance beyond the filter, that is remote from the grid-cathode of the amplifier, of effects due to a slowly changing current in any part of the input circuit which includes the filter and such as has been found to arise because of slow changes in the grid current due to variations in the voltage of the anode supply and/or due to variations in the filament temperature because of variations in the voltage of the filament supply.

In the modification of Fig. 3, the attenuation characteristic of the filter prevents appearance at the primary winding of the transformer of effects due to changes in current in the grid circuit which are slow as compared with the frequency of change of the signals whose amplitudes reflect changes in the magnitude of the condition under measurement.

While preferred embodiments of the invention have been shown, it is to be understood, of course, that further changes and modifications may be made within the scope of the appended claim.

What is claimed is:

In a measuring system comprising a converter of the vibrator type having one contact relatively movable between a pair of contacts for converting an input signal to an alternating current signal of predetermined frequency, an amplifier having an input circuit including a control grid for application thereto of said alternating current signal, and a high-pass filter, having capacitors in series with each other between said grid and said movable contact and forming a part of said input circuit and having conductive impedances successively connected between said capacitors and in shunt across said input circuit, for application to said grid of said alternating current signals without substantial attenuation, each of the filter sections having a time constant such that when multiplied by the frequency of said alternating current, the product lies between 3 and 30 cycles, for substantial attenuation of a slowly changing grid current to prevent modulation thereof by said converter.

RAYMOND E. TARPLEY.

REFERENCES CITED

The following references are of record in the file of this patent:

UNITED STATES PATENTS

| Number | Name | Date |
|---|---|---|
| 2,219,729 | Tahon | Oct. 29, 1940 |
| 2,229,702 | Larsen | Jan. 28, 1941 |
| 2,297,543 | Eberhardt et al. | Sept. 29, 1942 |
| 2,367,746 | Williams | Jan. 23, 1945 |
| 2,372,062 | Doorman | Mar. 20, 1945 |
| 2,459,730 | Williams | Jan. 18, 1949 |
| 2,485,948 | Williams | Oct. 25, 1949 |